United States Patent
Kawahara et al.

(10) Patent No.: US 10,631,546 B2
(45) Date of Patent: Apr. 28, 2020

(54) FROZEN BREAD DOUGH IMPROVER

(71) Applicants: MITSUBISHI CORPORATION LIFE SCIENCES LIMITED, Tokyo (JP); THE SCHOOL CORPORATION KANSAI UNIVERSITY, Osaka (JP)

(72) Inventors: Hidehisa Kawahara, Osaka (JP); Eiji Nakao, Oita (JP); Kenichi Ason, Oita (JP); Sakiko Ikeda, Saitama (JP)

(73) Assignees: MITSUBISHI CORPORATION LIFE SCIENCES LIMITED, Tokyo (JP); THE SCHOOL CORPORATION KANSAI UNIVERSITY, Osaka (JP)

(*) Notice: Subject to any disclaimer, the term of this patent is extended or adjusted under 35 U.S.C. 154(b) by 0 days.

(21) Appl. No.: 15/509,217

(22) PCT Filed: Aug. 28, 2015

(86) PCT No.: PCT/JP2015/074486
§ 371 (c)(1),
(2) Date: Mar. 7, 2017

(87) PCT Pub. No.: WO2016/039186
PCT Pub. Date: Mar. 17, 2016

(65) Prior Publication Data
US 2017/0258097 A1 Sep. 14, 2017

(30) Foreign Application Priority Data
Sep. 8, 2014 (JP) ................. 2014-181878

(51) Int. Cl.
A21D 2/08 (2006.01)
A21D 6/00 (2006.01)
A21D 8/04 (2006.01)
A21D 10/00 (2006.01)
A21D 2/18 (2006.01)

(52) U.S. Cl.
CPC ............ A21D 2/08 (2013.01); A21D 2/181 (2013.01); A21D 6/001 (2013.01); A21D 8/047 (2013.01); A21D 10/007 (2013.01)

(58) Field of Classification Search
CPC ...................................... A21D 2/08
See application file for complete search history.

(56) References Cited

U.S. PATENT DOCUMENTS

| | | | | |
|---|---|---|---|---|
| 2012/0177758 A1* | 7/2012 | Minami | ............... | A23L 2/52 424/756 |
| 2012/0177780 A1* | 7/2012 | Yano | ............... | A21D 2/245 426/21 |
| 2014/0228305 A1 | 8/2014 | Sato et al. | | |
| 2014/0234526 A1* | 8/2014 | Yasumatsu | ............... | A23L 2/56 426/650 |
| 2014/0308430 A1 | 10/2014 | Ason et al. | | |
| 2015/0164120 A1* | 6/2015 | Yasumatsu | ............... | C09B 61/00 426/540 |
| 2017/0196235 A1* | 7/2017 | Nakao | ............... | A23F 3/16 |

FOREIGN PATENT DOCUMENTS

| | | | | |
|---|---|---|---|---|
| CA | 1320462 | * | 7/1993 | ............ C12N 1/16 |
| JP | S61-247331 | | 11/1986 | |
| JP | 63-087933 | | 4/1988 | |
| JP | H01-191634 | | 8/1989 | |
| JP | 4-346745 | | 12/1992 | |
| JP | 4-346748 | | 12/1992 | |
| JP | H05-252894 | | 10/1993 | |
| JP | H06-113789 | | 4/1994 | |
| JP | H07-184640 | | 7/1995 | |
| JP | H08-196199 | | 8/1996 | |
| JP | H09-056361 | | 3/1997 | |
| JP | H10-057091 | | 3/1998 | |
| JP | H10-117671 | | 5/1998 | |
| JP | 2001-055338 | | 2/2001 | |
| JP | 2007-006838 | | 1/2007 | |
| JP | 2008-000133 | | 1/2008 | |
| JP | 2011-234643 | | 11/2011 | |
| JP | 2012/231747 | | 11/2012 | |
| JP | 2014-230540 | | 12/2014 | |
| JP | 2015-107081 | | 6/2015 | |
| WO | 2012/150683 | | 11/2012 | |
| WO | 2013031571 | * | 3/2013 | ............ A23L 1/221 |
| WO | 2013/065732 | | 5/2013 | |

OTHER PUBLICATIONS

"Kagaku to Seibutsu"; Chemistry and Biology, vol. 28, No. 11; 1990; pp. 736-739.
Kawahara, "Futo Tanpakushitsu no Kino to Reito Shokuhin Bun'ya eno Oyosei"; The Food Industry, vol. 49, No. 16; 2006; pp. 50-52.
International Search Report issued in WIPO Patent Application No. PCT/JP2015/074486, dated Dec. 1, 2015.

* cited by examiner

*Primary Examiner* — Elizabeth Gwartney
(74) *Attorney, Agent, or Firm* — Greenblum & Bernstein P.L.C.

(57) ABSTRACT

[Problem] To produce a frozen bread dough improver that has an effect of improving rising of frozen bread dough, is highly safe, and tasteless, using a method that is low-cost and low in environmental impact. Also, to effectively use yeast cell body residue produced as a byproduct of yeast extract.
[Means for Solving the Problem] Yeast cell body residue remaining after extracting useful extract from yeast is suspended in water and heated, after which the suspension is subjected to centrifugal separation and a supernatant is obtained. This fraction contains, per solid content, at least 45 wt % RNA, at least 5 wt % dietary fiber, and at least 10 wt % protein, and mannan content in the dietary fiber is at least 60 wt %. This can be used to improve rising of frozen bread dough.

6 Claims, No Drawings

FROZEN BREAD DOUGH IMPROVER

FIELD OF THE INVENTION

The invention of the instant application relates to a frozen bread dough improver which is obtained from yeast cell body residue.

BACKGROUND OF THE INVENTION

Like with fresh foods, freshness is viewed as extremely important to the quality of bread. For this reason, bread factories operate late at night, early in the morning, and on holidays to supply freshly baked bread to food stores and the like. Also, in order to provide bread having favorable freshness, "eat-in bakeries" producing and offering bread on-site are increasing in number. Maintaining freshness is thus a critical concern of those in the business of manufacturing and selling bread. Shortening a kneading time of bread dough and early preparation, such as a frozen dough bread-making method, are particularly desired. A frozen dough bread-making method is a method attempting to provide consumers with a freshly baked bread having a favorable taste by freezing bread dough which has already been kneaded, and thawing, fermenting, or baking the bread dough when required. However, yeast in the bread dough is damaged when frozen, and fermentation ability after thawing is reduced. Moreover, gluten formation may be impaired due to glutathione leaking from dead yeast, and the dough may not expand sufficiently when baked into bread.

Modifications to bread-making processes have been investigated in order to improve frozen bread dough quality. The prior art reports a method of completing kneading and fermentation ahead of time, then freezing, and then baking at a place of consumption (Patent Literature 1), a method of freezing without allowing frozen bread dough to ferment, then adding yeast and allowing the dough to ferment after thawing, then baking the dough (Patent Literature 2), a method of adding a quality improver to frozen dough (Patent Literature 3), or the like. In addition, there has been development of, for example, freezing-resistant yeast possessing characteristics in which fermentation ability after thawing is not reduced even when the dough has been fermented ahead of time and then frozen (Non-patent Literature 1 and the like).

However, each of these methods is complex, difficult work, and may not be fully effective in frozen bread dough, for example. Moreover, in recent years, interest in healthiness and in naturalness has increased and there is a trend in which use of chemical and synthetic additives has been severely curtailed.

Meanwhile, yeast contains components such as nucleic acid, amino acid, and peptides. Yeast extract can be used as a source of glutathione, or as yeast extract (a natural seasoning). Efficient use of yeast cell body residue, which is produced in large quantities as a byproduct during extraction, has been pursued. Various methods of producing yeast extract are known which use extracting enzymes, mediums, and the like (Patent Literature 4).

Cell body residue which remains after yeast extract and the like is extracted from yeast contains glucan, mannan, mannoprotein, proteins, lipids, and nucleic acids as primary components. A plurality of known publications address methods of treating such yeast cell body residue and methods of making effective use of the same. For example, Patent Literature 5 describes a method of treating waste water by making a yeast extract residue soluble using a specific enzyme. Patent Literature 6 describes a method of producing mannose by causing a yeast extract residue to be assimilated by microorganisms. Patent Literature 7 describes a method of obtaining a medicinal composition by alkali treatment of a yeast extract residue, followed by irrigation thereof. Patent Literature 8 describes a method of obtaining a microorganism culture substrate material by allowing a cell wall lytic enzyme or the like to act on yeast extract residue. Given the situation, a more effective method of using yeast cell body residue is desired.

RELATED ART

Patent Literature

Patent Literature 1: Japanese Patent Laid-open Publication No. S61-247331
Patent Literature 2: Japanese Patent Laid-open Publication No. H01-191634
Patent Literature 3: Japanese Patent Laid-open Publication No. H08-196199, Japanese Patent Laid-open Publication No. H10-117671, Japanese Patent Laid-open Publication No. 2008-000133
Patent Literature 4: Japanese Patent Laid-open Publication No. H05-252894, Japanese Patent Laid-open Publication No. H06-113789, Japanese Patent Laid-open Publication No. H09-056361
Patent Literature 5: Japanese Patent Laid-open Publication No. H07-184640
Patent Literature 6: Japanese Patent Laid-open Publication No. H10-057091
Patent Literature 7: Japanese Patent Laid-open Publication No. 2001-055338
Patent Literature 8: Japanese Patent Laid-open Publication No. 2007-006838

Non-Patent Literature

Non-patent Literature 1: Kagaku to Seibutsu (Chemistry and Biology) 28, 736, 1990

SUMMARY OF THE INVENTION

Problems to be Solved by the Invention

The instant application seeks to improve rising of frozen bread dough. Moreover, a frozen bread dough improver is preferred which is highly safe for foods and beverages and has no taste, and which can be manufactured at a low cost with a method having a low environmental impact. Another issue is to make effective use of yeast cell body residue, which is produced as a byproduct of yeast extract.

As a result of thorough research to resolve the above-noted issues, the inventors of the present invention have discovered that an extract of yeast cell body residue is effective in improving the rising of frozen bread dough.

Specifically, the present invention relates to:
(1) A frozen bread dough improver comprising yeast extract;
(2) The frozen bread dough improver according to (1), in which the yeast extract is obtained by extraction from yeast cell body residue;
(3) The frozen bread dough improver according to (1) or (2), in which the yeast is *Candida utilis*;
(4) The frozen bread dough improver according to any one of (1) to (3), in which RNA content per solid content of the yeast extract is at least 45 wt %, dietary fiber content is at least 10 wt %, and protein content is at least 15 wt %;

(5) The frozen bread dough improver according to (4), in which mannan content making up the dietary fiber is at least 50 wt %; and (6) A method of improving rising of a foodstuff after frozen storage in which the frozen bread dough improver according to any one of (1) to (5) is contained in frozen bread dough at 0.0001 to 0.5 wt %.

Effect of the Invention

According to the present invention, a yeast extract having an excellent effect in improving rising of frozen bread dough can be obtained from an edible yeast that is known to be safe, such as Torula yeast (*Candida utilis*), for example. The yeast extract can be used as a frozen bread dough improver. By adding a small amount of the yeast extract of the instant application to frozen bread dough, a reduction in rising caused by freezing can be remediated. Such yeast extract has no taste, and therefore does not impart a foreign taste to bread dough to which the yeast extract is added. Moreover, rising of frozen bread dough can be improved simply by adding the yeast extract to bread, and thus the yeast extract is easy to use.

Also, because the yeast extract is sourced from yeast, the yeast extract is a natural product and, unlike cases using plants or animals as raw materials, there is little risk of supply instability, price fluctuation, and quality variation. Moreover, cell body residue which remains after extracting the yeast extract or the like can be used as the raw material. A yeast extract improving the rising of frozen bread dough according to the present invention can be obtained from yeast cell body residue. Cell body residue of Torula yeast is produced in large quantities as a byproduct of manufacturing yeast extract (a seasoning) and other useful constituents. The present invention is able to make effective use of this yeast cell body residue, and is therefore also very advantageous in view of cost and reduction in industrial waste.

MODE FOR CARRYING OUT THE INVENTION

Hereafter, a concrete description of the present invention is given. The yeast referenced in the present invention is a yeast that can be used in food manufacture, and can be used without any particular limitation. Specific examples may include *Candida utilis, Saccharomyces cerevisiae*, and the like. Of these, *Candida utilis* is preferred. There is a trend of consumers preferring foodstuffs which have not been genetically modified, and a non-genetically modified yeast may also be used in the instant application.

The yeast cell body residue of the present invention is a residue remaining after yeast extract or useful constituents have been removed from yeast by an extraction process using one or more of hot water, acidic solution, alkaline solution, autolysis, mechanical pulverization, a cell wall lytic enzyme, a proteolytic enzyme, ribonuclease, or deaminase. Examples include "KR yeast" manufactured by Kohjin Life Sciences Co., Ltd. Such residue is typically primarily composed of glucan, mannan, protein, lipids, and nucleic acid. Structurally, the glucan, mannan, protein, and other components form a conjugate and are expected to form strong bonds. Residue remaining after acid extraction from yeast, in particular, is highly active and is preferably used as the yeast cell body residue used to manufacture the frozen bread dough improver according to the present invention.

The frozen bread dough improver of the present invention is obtained by first adding water to the yeast cell body residue noted above and preparing a cell body suspension having a concentration of 10 wt % of dried cell body weight. When necessary, a step of adjusting the pH of the cell body suspension to be neutral, removing supernatant by centrifugal separation, and adding water to the solids to prepare the cell body suspension having a concentration of 10 wt % may be performed one or more times. Cell body concentration of the cell body suspension is preferably a concentration of 10 wt % when obtaining the frozen bread dough improver according to the present invention. However, other concentrations may also be used. The obtained cell body suspension is subjected to a heat treatment at between 80 and 100° C. for at least 10 minutes, and preferably between 15 and 30 minutes. Next, sediment is removed with a centrifugal separator and a fraction containing nucleic acid, dietary fiber, and protein is obtained as the supernatant. That fraction, either in that state or after being dried, is the yeast extract effective in improving frozen bread dough, and can be used as a frozen bread dough improver.

When necessary, other components may also be added to the yeast extract obtained as described above. When blended with naturally-derived components, the yeast extract forms a naturally-derived frozen bread dough improver, which is preferred.

Yeast extract in which an amount of RNA content per solid content of the yeast extract is at least 45 wt %, and preferably at least 50 wt %; dietary fiber content is at least 10 wt %, and preferably at least 25 wt %; and protein content is at least 15 wt %, and preferably at least 20 wt %, has a high frozen bread dough improvement effect. Moreover, the higher the proportion of the dietary fiber made up by mannan, preferably at least 50 wt % and more preferably at least 70 wt %, the stronger the effect. Meanwhile, as constituents having a strong taste, inosinic acid, guanylic acid, and glutamic acid content is preferably low.

An STS method is used in the present invention to measure the RNA content. After 0.3 N potassium hydroxide is added to the sample yeast extract and hydrolysis is performed at 45° C. for one hour, 60% perchloric acid is added and the sample is subjected to centrifugation, then 260 nm wavelength light absorbency of the supernatant is measured. RNA content is found with the following formula.

$$\text{RNA content (mg/g)} = \text{Absorptivity } (0.0345) \times A260$$

A hydrolysis method is used to measure the content amount of protein in the yeast extract. After 5 ml of 6 N hydrochloric acid is added and dissolved in 0.1 g of the sample yeast extract and hydrolysis is performed at 110° C. for 24 hours, the total amount of the sample is transferred to a 25 ml volumetric flask, and is diluted with 0.02 N hydrochloric acid to 25 ml total. Two grams of the diluted solution are obtained and concentrated in a concentrator. After concentration, 2 ml of 0.02 N hydrochloric acid is added and the sample is concentrated once again. The concentrated sample is dissolved in 0.02 N hydrochloric acid and is diluted to 20 ml total, then is measured by a fully automatic amino acid analyzer (manufactured by Hitachi Ltd.).

A hydrolysis method is used to measure the dietary fiber content. The sample yeast extract is added to 1 N sulfuric acid and is hydrolyzed at 110° C. for 3.5 hours, then is neutralized, after which mannose and glucose (hydrolysis products) are measured using liquid chromatography, and are converted to glucan/mannan. An RI detector is used for detection, an SP810 (Shodex) is used for the separation column, and ultrapure water is used for the mobile phase.

The yeast extract obtained using the manufacturing method described above, with yeast cell body residue as the raw material, can be used without alteration as a frozen bread dough improver. Moreover, when necessary, other components may also be added to the yeast extract obtained as described above. When blended with naturally-derived components, the yeast extract forms a naturally-derived frozen bread dough improver, which is preferred.

The frozen bread dough improver according to the present invention is preferably used in a powdered or solution state and is added when mixing ingredients for a bread dough or during kneading. Intensity of the rising improvement effect of the present invention on frozen bread dough may differ according to the components in the bread dough. Therefore, a preferred blending amount differs according to the frozen bread dough. However, the blending amount may be 0.001 to 0.5 wt %, and is preferably 0.005 to 0.1 wt %.

The present invention is described in detail in embodiments below.

<Exemplary Manufacture>

Using a 10 N sulfuric acid, a 10% cell body suspension of *Candida utilis* Cs 7529 strain (FERM BP-1656 strain) was adjusted to a pH of 3.5, then was subjected to a heat treatment at 60° C. for 30 minutes, after which the suspension was separated into yeast extract and yeast cell body residue with a centrifugal separator. After this, water was added to the yeast cell body residue and an 8 wt % (dried cell body weight) concentration suspension was prepared. After adjusting 18 kg of the obtained yeast cell body residue suspension to pH 7.0, solids and supernatant were separated by a separator (Alfa Laval centrifugal separator: LAPX202 BGT-24-50/60) and the solids were collected. The solid content was suspended in water to yield an 8 wt % concentration solution. The solids and supernatant were once again separated by the separator, and the solids collected again. Water was added to the solids to prepare a 10 wt % suspension, which was then heat treated at 90° C. for 20 minutes, after which the suspension was cooled in cold water. After this, the supernatant was collected by the separator; concentrated by a large Evapor and evaporator; and freeze-dried to obtain approximately 80 g powdered yeast extract. In the obtained yeast extract, RNA content was 56.5 wt %, dietary fiber content was 15.0 wt %, and protein content was 23.9 wt %. Mannan content made up 67.4 wt % of the dietary fiber. The yeast extract was used as a frozen bread dough improver.

<Embodiment 1> Baking Trial of Frozen Bread Dough

Strong flour (200 g), butter (8 g), sugar (6.8 g), skim milk (4.8 g), salt (4 g), dry yeast (2.2 g), and 72 ml of a 0.0414 wt % aqueous solution of the frozen bread dough improver obtained by the exemplary manufacture (0.01 wt % per total dough) were placed in a bread machine manufactured by Panasonic Corporation to be mixed, were kneaded to create a dough, and a primary fermentation was performed. The dough was then removed from the bread machine, placed in a rectangular loaf pan, and frozen overnight at −20° C., after which the dough was thawed at room temperature. Secondary fermentation was performed at 34° C. for 45 minutes, then the dough was baked at 170° C. for 22 minutes in a home-use oven to produce bread. A volume of the resulting bread was measured using a rape seed substitution method. An overview of the rape seed substitution method follows. Rape seed (plant seed having a diameter of 1 mm) is accurately poured into cup A and leveled off. An appropriate amount of the rape seed in cup A is then transferred to a different vessel B. A sample is placed in cup A and the rape seed transferred to vessel B is then accurately returned to cup A and leveled off. The rape seed remaining in vessel B is placed in a graduated cylinder and the volume of the rape seed is measured. This volume is treated as the volume of the sample.

Comparative Example 1

Comparative Example 1 was conducted similarly to Embodiment 1 except that the frozen bread dough improver was not added in Embodiment 1.

Comparative Example 2

Comparative Example 2 was conducted similarly to Embodiment 1 except that 0.02 wt % of an emulsifier (PANMAK 200V, manufactured by Riken Vitamin Co., Ltd.) was added to the dough instead of the frozen bread dough improver in Embodiment 1.

As a result of evaluation, volume of the bread after baking according to Embodiment 1 was 1623.3 $cm^3$, whereas the volume of the bread after baking according to Comparative Example 1 was 1035.5 $cm^3$ and the volume of the bread after baking according to Comparative Example 2 was 1561.2 $cm^3$. The volume of the baked bread obtained in Embodiment 1 was approximately 1.57 times that of Comparative Example 1, and the volume after baking was greater than that of Comparative Example 2, to which the emulsifier had been added. This demonstrates that the frozen bread dough improver according to the present invention improves the rising of frozen bread dough.

INDUSTRIAL APPLICABILITY

As described above, rising of frozen bread dough can be improved by adding the frozen bread dough improver manufactured with the present invention to frozen bread dough.

The invention claimed is:

1. A frozen bread dough comprising frozen bread dough and 0.0001 to 0.5 wt % of a frozen bread dough improver, wherein said frozen bread dough improver comprises a yeast extract from a cell body residue of a yeast, and wherein the yeast extract comprises:
   a) RNA content of at least 45 wt % per solid content of the yeast extract;
   b) dietary fiber of at least 10 wt % per solid content of the yeast extract; and
   c) protein content of at least 15 wt % per solid content of the yeast extract.

2. The frozen bread dough according to claim 1, wherein the dietary fiber of the yeast extract comprises at least 50 wt % mannan content.

3. The frozen bread dough according to claim 1, wherein the yeast is *Candida utilis*.

4. A method of improving rising of a foodstuff after frozen storage comprising:
   a) admixing:
      i) a yeast extract from a cell body residue of a yeast, and
      ii) bread dough or the ingredients for bread dough, said ingredients for bread dough then being admixed, to obtain a frozen bread dough improver containing bread dough; and
   b) freezing the frozen bread dough improver containing bread dough,
   wherein the yeast extract comprises:
      i) RNA content of at least 45 wt % per solid content of the yeast extract;

ii) dietary fiber of at least 10 wt % per solid content of the yeast extract; and iii) protein content of at least 15 wt % per solid content of the yeast extract.

5. The method of improving rising of a foodstuff after frozen storage according to claim 4, wherein the dietary fiber of the yeast extract comprises at least 50 wt % mannan content.

6. The method of improving rising of a foodstuff after frozen storage according to claim 4, wherein the yeast is *Candida utilis*.

* * * * *